United States Patent
Tewksbary

(10) Patent No.: US 7,716,182 B2
(45) Date of Patent: May 11, 2010

(54) VERSION-CONTROLLED CACHED DATA STORE

(75) Inventor: David E. Tewksbary, Bolton, MA (US)

(73) Assignee: Dassault Systemes Enovia Corp., Lowell, MA (US)

(*) Notice: Subject to any disclaimer, the term of this patent is extended or adjusted under 35 U.S.C. 154(b) by 287 days.

(21) Appl. No.: 11/137,460

(22) Filed: May 25, 2005

(65) Prior Publication Data

US 2006/0271606 A1  Nov. 30, 2006

(51) Int. Cl.
G06F 7/00 (2006.01)
(52) U.S. Cl. .................................................. 707/638
(58) Field of Classification Search ................ 707/200, 707/201, 202, 203, 204, 205
See application file for complete search history.

(56) References Cited

U.S. PATENT DOCUMENTS

| | | | | | |
|---|---|---|---|---|---|
| 4,714,992 | A | * | 12/1987 | Gladney et al. | 707/206 |
| 4,875,159 | A | * | 10/1989 | Cary et al. | 707/203 |
| 4,912,637 | A | * | 3/1990 | Sheedy et al. | 707/203 |
| 5,047,918 | A | * | 9/1991 | Schwartz et al. | 767/203 |
| 5,278,979 | A | * | 1/1994 | Foster et al. | 707/203 |
| 5,283,894 | A | | 2/1994 | Deran | 395/600 |
| 5,430,869 | A | | 7/1995 | Ishak et al. | 395/600 |
| 5,600,832 | A | * | 2/1997 | Eisenberg et al. | 707/203 |
| 5,623,661 | A | * | 4/1997 | Hon | 707/1 |
| 5,649,200 | A | * | 7/1997 | Leblang et al. | 717/122 |
| 5,734,898 | A | * | 3/1998 | He | 707/203 |
| 5,734,899 | A | * | 3/1998 | Yoshizawa et al. | 707/203 |
| 5,745,753 | A | | 4/1998 | Mosher, Jr. | 395/618 |
| 5,805,889 | A | * | 9/1998 | Van De Vanter | 717/107 |
| 5,806,065 | A | | 9/1998 | Lomet | 707/8 |
| 5,806,078 | A | * | 9/1998 | Hug et al. | 715/511 |
| 6,018,747 | A | * | 1/2000 | Burns et al. | 707/203 |
| 6,026,413 | A | * | 2/2000 | Challenger et al. | 707/202 |
| 6,088,717 | A | * | 7/2000 | Reed et al. | 709/201 |
| 6,122,645 | A | | 9/2000 | Bohannon et al. | 707/203 |
| 6,314,434 | B1 | * | 11/2001 | Shigemi et al. | 707/203 |
| 6,327,584 | B1 | * | 12/2001 | Xian et al. | 707/1 |
| 6,449,624 | B1 | * | 9/2002 | Hammack et al. | 707/203 |

(Continued)

FOREIGN PATENT DOCUMENTS

EP  0 689 140 A2  6/1995

(Continued)

OTHER PUBLICATIONS

Author Unknown, "Efficient, Approximate Cache Invalidation for an Object Server," IBM Technical Disclosure Bulletin, vol. 37, No. 1, Jan. 1994, pp. 325-326.

(Continued)

*Primary Examiner*—John R Cottingham
*Assistant Examiner*—Mohammed R Uddin
(74) *Attorney, Agent, or Firm*—Proskauer Rose LLP

(57) ABSTRACT

Described are methods, systems, and apparatus, including computer program products for a version-controlled cached data store. A first node is associated with a first identifier and a first version. A control file is received, where the control file includes information associating a second node with a second identifier and a second version. The first version is compared with the second version when the first identifier and the second identifier are identical.

24 Claims, 3 Drawing Sheets

U.S. PATENT DOCUMENTS

| | | | |
|---|---|---|---|
| 6,598,059 B1* | 7/2003 | Vasudevan et al. | |
| 6,631,386 B1* | 10/2003 | Arun et al. | 707/203 |
| 6,681,389 B1* | 1/2004 | Engel et al. | 717/173 |
| 6,757,893 B1* | 6/2004 | Haikin | 717/170 |
| 6,868,414 B2 | 3/2005 | Khanna et al. | 707/3 |
| 7,117,052 B2* | 10/2006 | Lucas et al. | 700/83 |
| 7,127,322 B2* | 10/2006 | Kreidler et al. | 700/169 |
| 7,421,541 B2* | 9/2008 | Long et al. | 711/141 |
| 2002/0007402 A1* | 1/2002 | Thomas Huston et al. | 709/217 |
| 2002/0062305 A1* | 5/2002 | Gawne-Cain | 707/1 |
| 2002/0073082 A1 | 6/2002 | Duvillier et al. | 707/3 |
| 2002/0073110 A1 | 6/2002 | Duvillier et al. | 707/206 |
| 2002/0120648 A1* | 8/2002 | Ball et al. | 707/511 |
| 2003/0033328 A1* | 2/2003 | Cha et al. | 707/204 |
| 2004/0044643 A1* | 3/2004 | deVries et al. | 707/1 |
| 2004/0168115 A1* | 8/2004 | Bauernschmidt et al. | 715/500 |
| 2005/0004942 A1* | 1/2005 | Madsen et al. | 707/104.1 |
| 2005/0187989 A1* | 8/2005 | Kaneko | 707/203 |
| 2005/0262107 A1* | 11/2005 | Bergstraesser et al. | 707/100 |
| 2006/0101092 A1* | 5/2006 | Ishida et al. | 707/203 |
| 2006/0129584 A1* | 6/2006 | Hoang et al. | 707/101 |

FOREIGN PATENT DOCUMENTS

EP     0 864 129 B1     12/1996

OTHER PUBLICATIONS

Simonson, J., et al., "Version augmented URIs for reference permanencevia an Apache module design," Computer Networks and ISDN Systems 30 (1998), pp. 337-345.

International Search Report for PCT/US2006/019289 mailed Sep. 21, 2006.

* cited by examiner

VERSION-CONTROLLED CACHED DATA STORE

FIELD OF THE INVENTION

The present invention relates generally to data storage and, more specifically, to a version-controlled cached data store.

BACKGROUND

Many search schemes and indexing approaches have been developed to manage file systems and/or databases. One example of an approach is a binary tree approach. In a binary tree approach, a node is established as the root node and the first node that has a greater value than the root node becomes the root node's right child node. Likewise, the first node with a value lower than the root node becomes the root node's left child node. A node that has a value greater than the root node, but less than the root node's right child node becomes the right child node's left child node. The tree structure is built this way as nodes are added to the tree. Periodically, the tree may be rebalanced to even the distribution of nodes from one side of the root node to the other. Ideally, the root node is the middle value of all nodes so that all searches take approximately the same amount of time to complete (i.e., so roughly half the searches traverse the left child node branch and half traverse the right child node branch). In an unbalanced tree, that is, where one node branch of the root node is significantly larger than the other node branch, search performance suffers because one branch of the search tree takes significantly longer to search through. After rebalancing the tree, neither side of the tree has generally more or less nodes than the other side.

Another approach to searching is the "B-Tree" approach. In a B-Tree, the nodes of the tree may have a larger number of data elements per node compared to the one data element of the binary tree. Correspondingly, a B-Tree may have a larger number of child nodes per parent node since the child nodes contain values between the parent node element values. Unlike the binary tree node which has one data element and two pointers, one for nodes greater than the current node and one for nodes less than the current node, the B-Tree node may have, for example, four data elements per node. The searched-for term is compared against the elements at the current node level, and if the searched-for term falls between nodes, a pointer for that gap is followed.

Using a B+-tree, or other variants, another approach caches portions of the index which are frequently accessed. For example, see US patent publication number 2003/0033328. The nodes that are cached and read are acquired from the database without a latch. There is a scheme described that uses a latch bit and a version number to ensure that the cached files are accurate and consistent. During the read operation, a version of the node is copied into a register. The contents of the node are read. A latch bit of the read node is examined to ensure that the node has not been latched by another process. The version number of the read node is compared to the version number in the register to ensure that the contents have not been updated during the read operation. If both the latch bit is not set and the version has not changed, then the node is in a consistent state and the node is used.

SUMMARY OF THE INVENTION

The invention described herein provides systems and methods for achieving a version-controlled cached data store through one or more implementations of various aspects. In one aspect, there is a method for a version-controlled cached data store. In the method, a first node is associated with a first identifier and a first version. The method also involves receiving a control file, which includes information associating a second node with a second identifier and a second version. The method further includes comparing the first version with the second version when the first identifier and the second identifier are identical.

In another aspect, there is another method for a version-controlled cached data store. The method includes transmitting a first node with a first identifier and a first version and transmitting a control file. The control file includes information associating a second node with a second identifier and a second version and the control file is used by a receiving component for comparing the first version with the second version when the first identifier and the second identifier are identical.

In some implementations of any of the aspects herein, the method also includes removing the first node if the first version and the second version are different and the first identifier and the second identifier are identical. The method can also include providing a set of cached nodes including the first node. Some of those implementations include receiving the second node if the first node has been removed and in some implementations, receiving involves receiving the second node from a server.

In another implementation, the method involves preventing the control file from being modified by a first process. The first node may then be generated by a second process, the second process optionally generating a list including new nodes generated by the second process. The second process can also modify the information of the control file that associates the second node with the second version and the second identifier. In some implementations, modifying the information of the control file includes replacing the second version with the first version when the first identifier is identical to the second identifier, with the first version representing a version subsequent to the second version. In those implementations, the first process can be prevented from modifying the control file until the second process has completed modifying the control file.

In some implementations, the second process generates the first node by copying the first node and modifying the copy. The second process then associates the copy of the first node with the first identifier and a new, third version. Once the new version of the file is associated with the third version, the second process modifies the control file, replacing the second version with the third version where the first identifier is identical to the second identifier. The first node is then removed, leaving the modified copy of the first node (i.e., the copy being associated with the third version).

In some implementations, the control file is received from a server. In those implementations, the method involves preventing a first process from modifying the control file on the server. A second process modifies the second node associated with the second identifier and a second version. The second process also modifies the received control file such that the first version is set to the second version if the first identifier equals the second identifier. The modified control file is then transmitted to the server.

In another aspect, there is a system for a version-controlled cached data store. The system includes a first node associated with a first identifier and a first version, a control file comprising information associating a second node with a second identifier and a second version, and a comparison module configured to compare the first version with the second version. In a preferred implementation, the system also includes a local store, which in turn includes the first node and the comparison module. The system also includes a remote store which includes the control file and the second node, wherein the comparison module is further configured to retrieve the control file from the remote store. The system also has a locking module for preventing changes to the control file. In some implementations the system also includes a first writing module configured to direct the locking module to prevent modifications to the control file by a second writing module. One example of a locking module uses a lock file to prevent access.

Some implementations include a reading module configured to read the first node if the comparison module determines that the first version and the second version are identical. In some of these implementations, the first node has a maximum number of data elements. The maximum number of data elements may be based on a size of an Input/Output read operation or is equivalent to a maximum number of elements for a single Input/Output read operation. In one implementation, the maximum number of data elements is 128 elements.

In another aspect, there is a computer program product, tangibly embodied in an information carrier for use in a version-controlled cached data store. The computer program product includes instructions that are operable to cause a data processing apparatus to perform a variety of functions. The instructions are operable to associate a first node with a first identifier and a first version. The instructions are also operable to receive a control file, the control file comprising information associating a second node with a second identifier and a second version. The instructions are further operable to compare the first version with the second version when the first identifier and the second identifier are identical.

In still another aspect, there is a means for a version-controlled cached data store. The means includes means for associating a first node with a first identifier and a first version. The means for the version-controlled cached data store also includes means for receiving a control file, the control file including information that associates a second node with a second identifier and a second version. The means also includes means for comparing the first version with the second version when the first identifier and the second identifier are identical.

Implementations can realize one or more of the following advantages. A latch bit is not needed for each node. Cached nodes are kept in cache and used until the version of that node is changed. The need to read nodes (e.g., to obtain version information and latch information) prior to each read operation is eliminated. A control file is used to transfer version information. Nodes with incorrect version numbers are deleted from the cache and only replaced on an as needed basis. Having a larger number of data elements per node, as well as more child nodes per node, flattens the B-tree, lowering the number of node traversals necessary to find the sought-after value. The larger number of data elements per node also allows a B-Tree to remain unbalanced longer as data elements are inserted and deleted (e.g., compared to a binary tree, which has one element per node). Allowing for an unbalanced tree reduces the resources used to maintain a balanced tree. By setting the number of data elements equal to an Input/Output operation, efficiency is maximized by utilizing the maximum retrieval of data elements during a single request for a node.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which.

DETAILED DESCRIPTION

Figure 1:
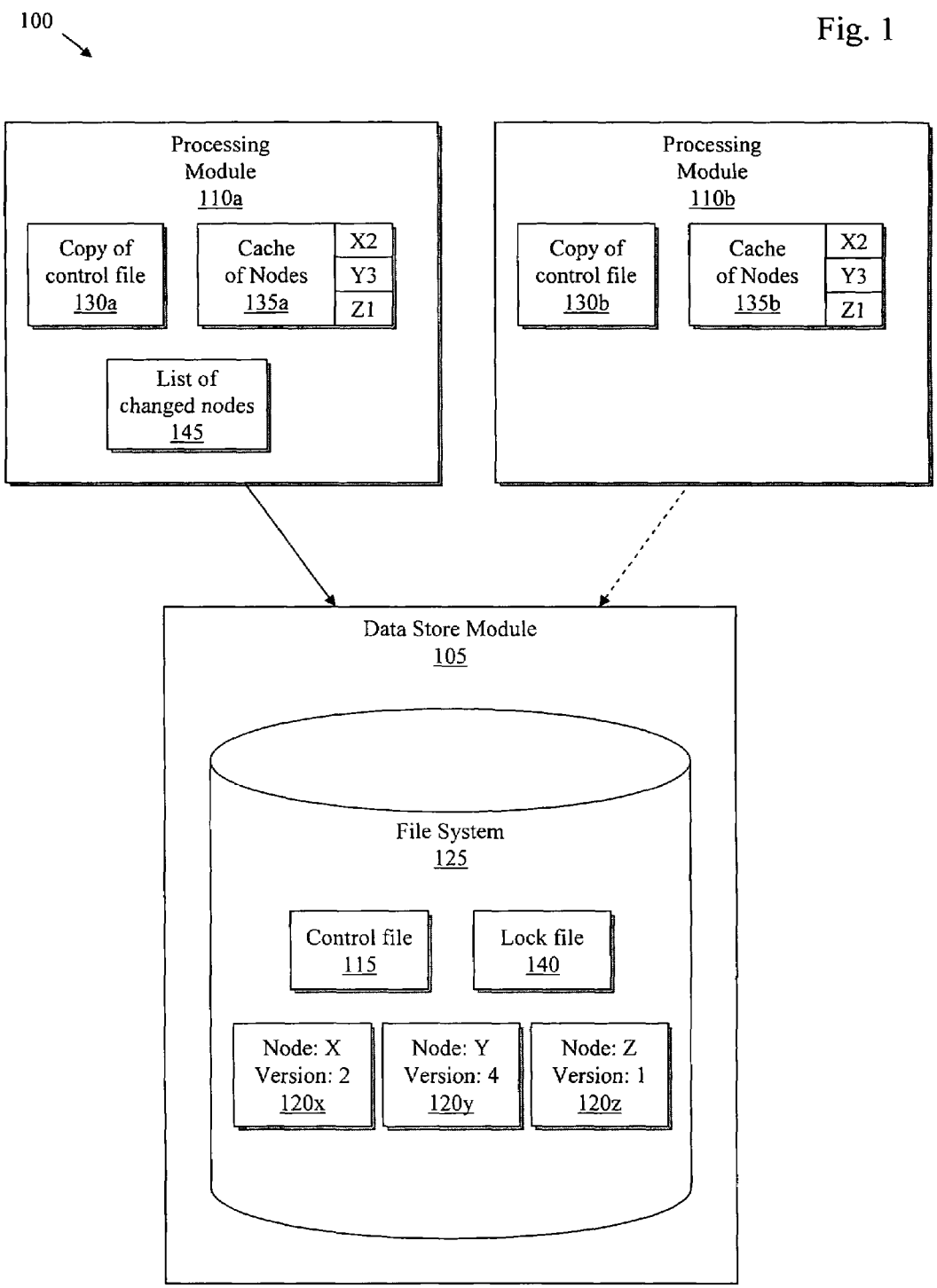
FIG. 1 depicts an architecture for a version-controlled cached data store.

FIG. 1 depicts an architecture 100 for a version-controlled cached data store. As illustrated in FIG. 1, there is a data store module 105 and one or more processing modules 110a, 110b (generally 110). The data store module 105 includes a control file 115 and one or more nodes (120x, 120y, 120z, generally 120) that represent the database. The control file 115 and nodes 120 reside on the file system 125 of the data store module 105. The control file 115 includes information about nodes 120 in the data store module 105. In one embodiment, the nodes 120 are organized as a B-Tree with multiple data elements per node and references to other data nodes.

The information in the control file 115 associates each node 120 with an identifier and a version. The identifier allows the processing modules 110 to compare different nodes, distinguishing one node $120_1$ from another node $120_n$. The version information allows the processing modules 110 to compare versions of nodes stored in their respective cache with the versions in the control file 115 associated with identical identifiers. For example, one version of node 120x (e.g., version 1) may reflect node 120x before a write operation and another version may reflect node 120x after a write operation (e.g., version 2). The processing module 110 can determine if their cached nodes are the latest versions using a simple comparison of their cached contents to the control file 115. Table 1 illustrates an example of the association of an identifier to a version that can be included in the control file 115. Table 1 uses nodes 120x, 120y, and 120z for illustration.

TABLE 1

| Identifier | Version |
|---|---|
| X | 2 |
| Y | 4 |
| Z | 1 |

The processing modules 110 perform comparisons and read/write operations on the nodes 120 and control file 115 as well as copies of the same stored in the processing module's memory. The comparisons done by the processing module 110 can be performed by a comparison module (not shown) that is included as part of the processing module 110. The processing module 110 includes a copy (e.g., 130a, 130b (generally 130)) of the control file 115 as well as copies (e.g., cache 135a, 135b, generally 135) of some of the nodes 120 of the data store module 105.

Figure 2:
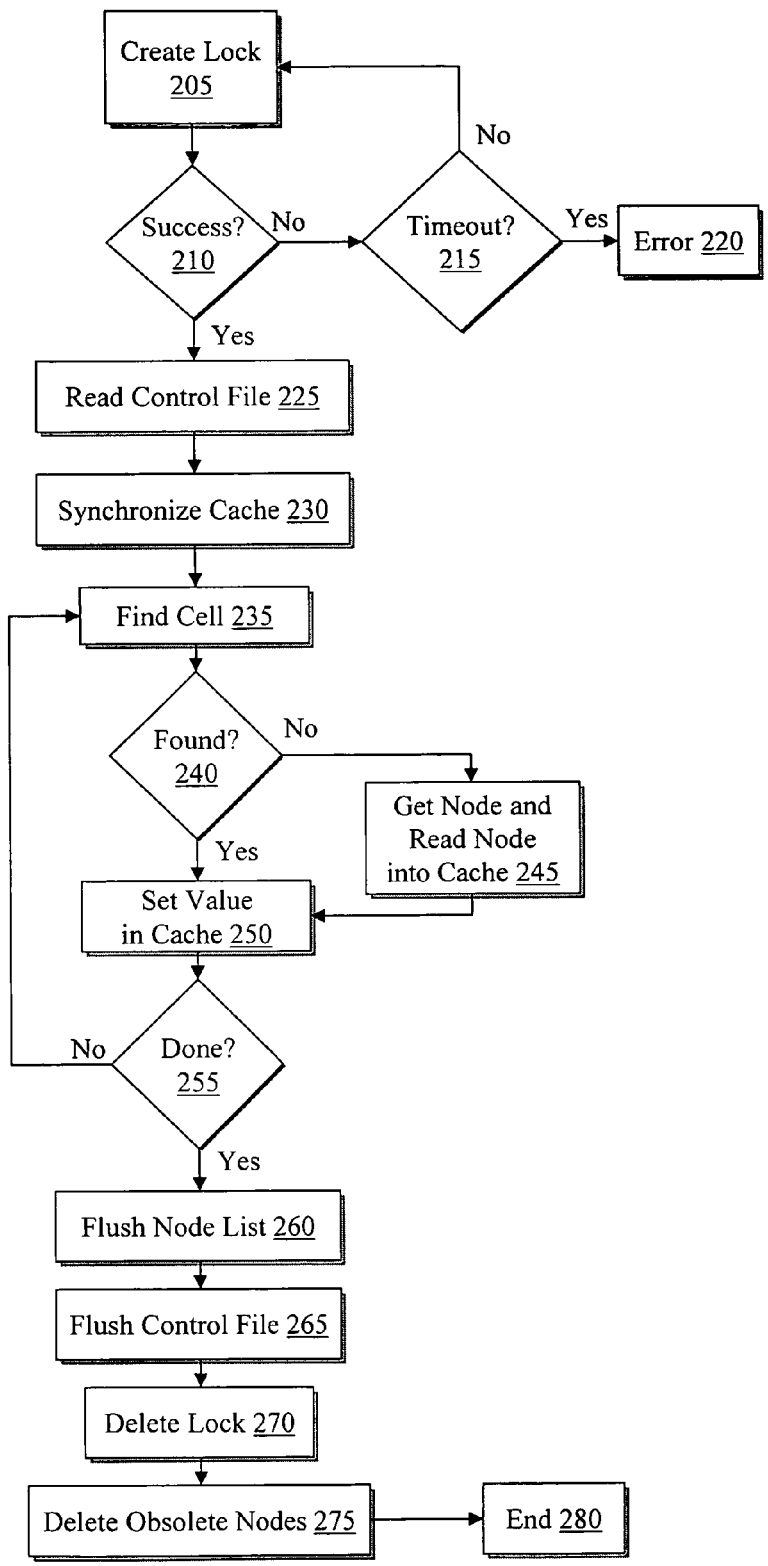
FIG. 2 is a flowchart depicting a process for writing used in a version-controlled cached data store.

In a process more fully described with respect to FIG. 2, the processing module 110a, which performs a write operation, creates a lock file 140 on the file system 125 of the data store module 105. The presence of the lock file 140 prevents other processing modules 110b from changing, modifying, and/or writing to the control file 115 or the nodes 120 that represent the database. During the processing module's 110a write operations, the processing module 110a adds, deletes, and/or modifies nodes located in the processing modules cache 135a as well as modifies the copy 130a of the control file. As these additions, subtractions, and modifications are made to the cache 135a and control file copy 130, a list of changed nodes 145 is created on the processing module 110a. The list of changed nodes 145 represents the subset of the cached nodes 135a that the processing module 110a has generated and/or modified during a write operation.

If a processing module 110b is performing read operations, that processing module 110b has a copy 130b of the control file 115 and a cache 135b of nodes representing a subset of the nodes 120 on the data store module 105. Typically no nodes are changed during a read operation so no list of changed nodes is present or generated on the processing module 110b.

FIG. 2 is a flowchart depicting a; process 200 for writing used in a version-controlled cached data store. For illustrative purposes, the system 100 is used as an example to describe the process 200. The processing module 110a attempts to create (205) a lock on the control file 115. If the processing module 110a determines (210) locking the control file 115 is not successful, the processing module 110a determines (215) if a timeout occurred. If a timeout occurred, the processing module 110a enters (220) an error state. If a timeout did not occur, the processing module 110a attempts to create (205) a lock on the control file 115 again. If processing module determines (210) that locking the control file 115 is successful, the processing module 110a retrieves the control file 115 and reads (225) a copy 130a of the control file 115 into memory (e.g., the control file 115 exists on disk 125 in the data store module 105 and the copy 130a exists in the processing module's file system or memory).

The control file 115 (and copy 130a thereof) includes, information associating nodes 120 on the file system 125 (120, 125 from FIG. 1) with node identifiers and versions. For example, node 120x is associated on the file system 125 with an identifier, "X" and a version "2", node 120y is associated with identifier "Y" and version "4", and node 120z is associated with identifier "Z", version "1". When the processing module 110a initially reads (225) the copy 130a of the control file 115, the information associating nodes 120 with identifiers and versions is the same in the copy 130a and the original control file 115. Once the copy 130a is read (225) into memory, the processing module 110a then synchronizes (230) the cache 135a of nodes.

Synchronization (230) is accomplished by examining the control file 130a, which represents nodes 120 on the file system 125, and comparing the information associating nodes with identifiers and versions in the control file 130a with the cache 135a of nodes in the processing module 110a. The processing module 110a determines, for nodes with identical identifiers, which nodes in the cache 135a are associated with the same version as nodes 120 on the file system 125. For example, if a node associated with identifier "X" 120x in the control file 130a is associated with version 2 and node X2 (associated with identifier "X") in the cache 135a is version 2, then the processing module 110a deems node X2 in the cache 135a to be synchronized. If a node in the cache 135a is associated with a different version than the node information in the control file 130a (where the nodes are associated with the same identifier), the node in the cache 135a is deemed out-of-synch and is removed. For example, if a node 120y (associated with identifier "Y") is associated with version "4" in the control file 130, but the node Y3 in the cache 135a associated with identifier "Y" is associated with version "3", the node Y3 in the cache 135a is out-of-synch. Because that node Y3 in the cache 135a is out of synch, that node Y3 in the cache 135a is removed. While synchronizing (230) the cache 135a, the processing module 110a compares the version of every node in the copy 130 of the control file to the versions of nodes in the cache 135a associated with the same identifier, keeping or removing nodes as described above.

After the cache in memory is synchronized (230), the processing module 110a traverses the tree to find (235) the node that will be modified and/or inserted. During and/or after traversing the tree, the processing module 110a determines (240) if the node was found. If processing module 110a determines (240) that the node was not found after the tree is traversed, the processing module 110a determines that the value should be inserted into the appropriate node and gets (245) the node from the and reads (245) the node into cache. Inserting a node (and re-balancing of the tree if necessary) can be performed using known techniques.

Once the processing module 110a determines to insert (245) the value into the tree, the value is set (250) in the modified/new node and the node is associated with a new version (and additionally associated with an identifier in the case of a newly created node). In one implementation, associating an existing node with a new version involves examining the version the node is associated with (e.g., "2" for node 120x) and incrementing the version (e.g., "3" for node 120x). Newly created nodes are associated with an initial version (e.g., version "1"). The processing module 110a then updates the information in the copy 130a of the control file associating the node with that identifier with the new/initial version. Thus the node in the cache 135a is associated with an identifier and a new/initial version and the information in the copy 130a of the control file associates the node with the same identifier and the same version. The new and/or modified nodes are also added to the list of changed nodes 145 in the processing module 110a.

Once an insertion/modification is complete (235 through 250), the processing module 110a determines (255) if any more nodes need to the processed (i.e., the processing module determines whether this set of write operations have been completed). If the processing module 110a determines (255) that additional nodes need to be processed, the processing module finds (235) the next value in the tree, and the processing module 110a repeats 235 through 255 until the processing module 110a determines (255) all write procedures have been completed.

Once the processing module 110a determines (255) all write procedures have been completed, the processing module 110a flushes (260) the list of changed nodes (145 from FIG. 1). Flushing (260) the list of changed nodes 145 involves writing the nodes in memory that have changed versions to the file system with the new version. For example, the list of changed nodes 145 can represent the nodes in memory that are marked as "dirty" (e.g., the node has changed). Additionally, the nodes in memory that have been changed (and the ones that have not been changed) are removed from memory. At this point, nodes associated with the previous versions are on the file system 125, as are nodes associated with new versions. The control file 115 on file system, however, still contains information associating the nodes on the file system with the previous versions.

The processing module 110a then flushes (265) the control file 130. Flushing the control file 130 involves writing the copy 130 of the control file (made in 225) to the file system, replacing control file 115 (i.e., control file 115 becomes control file 130). Once the copy 130 of the control file is written to the file system 125, the only file containing information associating nodes with versions is the control file 130 on the file system. In some implementations, the copy 130 of the control file does not replace the control file 115 on the file system 125, rather the control file 115 is updated to reflect the changes made to the copy 130 of the control file. For example if node 120x is associated with the identifier "X" in the control file 115 and the version "2" was updated during the set value (250) operation, node 120x in the copy 130 of the control file is associated with identifier "X" and version "3". When the control file is flushed (265), the control file 115 is updated such that the node associated with identifier "X" and version "2" is instead associated with identifier "X" and version "3" (i.e., the same version as the updated version in the cache 135a). It can be seen that prior to the flushing (e.g., 260 and/or 265), any changes to nodes generated on the processing module 110a can be rolled back by not incorporating the changes-into the control file 115 of the data store module 105 and simply deleting any new or modified nodes in the processing module 110a without transmitting them to the data store module 105 or deleting nodes on the data store module 105 that have no corresponding entries in the control file 115.

The processing module 110a then deletes (270) the lock on the control file 115. The processing module 110a then deletes (275) the obsolete nodes. An obsolete node is a node on the file system 125 associated with a version that is not included in the information contained in the control file 130 on the file system (i.e., nodes associated with "old" versions). After the processing module 110a finishes deleting (275) the obsolete nodes, the processing module 110a is finished with the write operation and enters an end state (280) for this operation.

Figure 3:
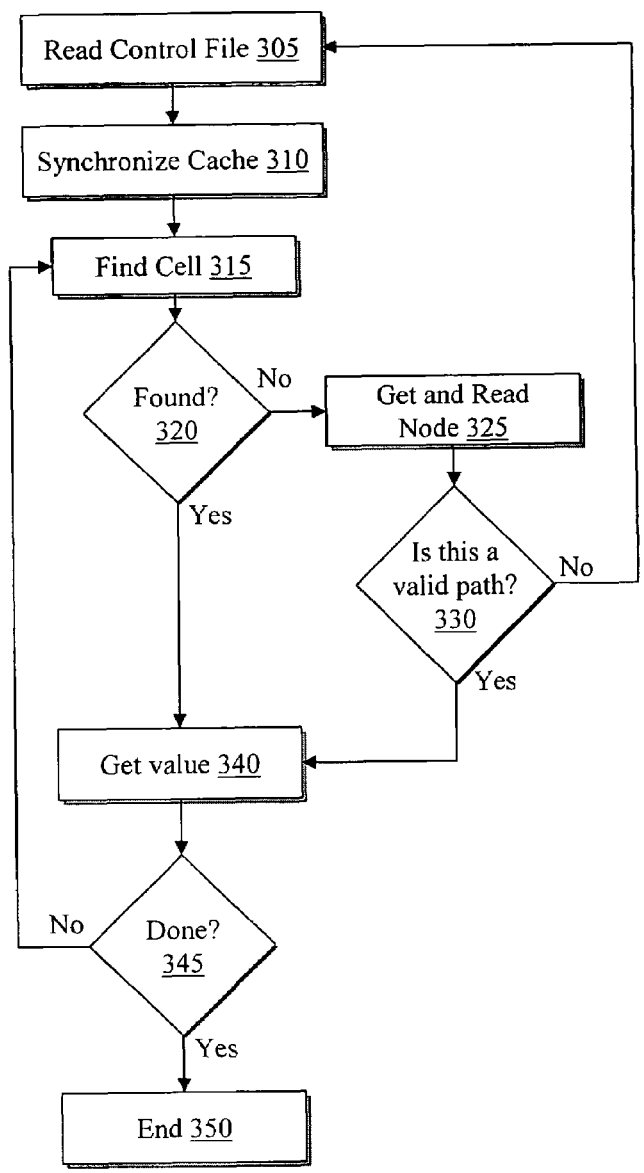
FIG. 3 is a flowchart depicting another process for reading used in a version-controlled cached data store.

FIG. 3 is a flowchart depicting a process 300 for reading used in a version-controlled cached data store. For illustrative purposes, the system 100 is used as an example to describe the process 300. A processing module (e.g., module 110b) reads (305) a copy 130 of the control file 115 into memory (e.g., the control file 115 exists on disk and a copy 130b exists in the processing module's memory). The processing module 110b then synchronizes (310) the in-memory cache of nodes (e.g., 135b) in a manner similar to the manner described herein with respect to synchronizing the cache in FIG. 2 (i.e., 230).

After the cache in memory is synchronized (310), the processing module 110b traverses the tree to find (315) the node that will be read. During and/or after the tree is traversed, the processing module 110b determines (320) if the node was found. If processing module 110b. determines (320) that the node was not found (e.g., because that node was deleted during the synchronization process), the processing module 110b attempts to get and read (325) the node from the data store module 105. This advantageously ensures that the removed node that is received is the latest version included in the data store module 125 at the time of the read operation. If the read operation attempts to retrieve a node that is being modified by a processing module 110a (and is therefore locked), the read operation gets the last committed version of the node from the data store module 105. The last committed version of the node is the version that existed before the processing module 110a locked the node for writing (because the new, modified node is not retrievable until the processing module 110a commits the changed node and the changed copy 130 of the control file to the file system 125). Retrieving the last committed version of the node ensures that the retrieved node is read-consistent with the reading processing module 110b.

To retrieve the node, first, the processing module 110b determines (330) if the path that the processing module 110b expects to find the node in on the data store module 105 is a valid path. Path determination is accomplished by examining the file system 125 location that corresponds to the node identifier and node version. If the node with that identifier and that version does not exist, the path is not valid. Using path validation is advantageous in that no locking or latching is needed to read nodes or determine if the node being retrieved is the latest committed node. If the processing module 110b determines (330) that the path is not a valid path (e.g., that the node does not exist on the file system 125 of the data store module 105 at the expected location, or the folder where the node is expected to be does not exist), the processing module 110b reads (305) into memory a copy 130 of the control file 115 from data store module 105. Re-reading (305) the control file 115 into memory is done to determine if any writes (process 200 of FIG. 2) occurred between when the copy 130 of the control file 115 was read into memory the first time and when the node was determined (330) not to have a valid path.

If the processing module 110b determines (330) that the path to the node on data store module 105 is correct, the processing module 110b reads (335) a copy 135b of the node into memory and the value in the node is retrieved (340). When the nodes 120 are organized as a B-Tree with multiple data elements per node, the nodes 120 can have a maximum number of data elements per node 120 depending on the tree implementation. For example, in some implementations, the maximum number of data elements is based on the size of an Input/Output read operation (e.g., reading 512 kilobytes per read operation). In other implementations, the maximum number of elements is equivalent to a maximum number of elements for a single Input/Output read operation such as reading a maximum of 128 data elements. In these other implementations, reading 128 data elements to retrieve a single node beneficially allows the processing of the maximum number of allowable data elements in a single operation.

Once the value is retrieved (345), the processing module 110b determines (345) if any more nodes need to be read (e.g., is the processing module "done" reading nodes?). If the processing module 110b determines (345) that more nodes need to be read, the processing module 110b returns to 315 and repeats 315 through 345 until the processing module 110b determines (345) that the processing module 110b is done reading nodes. Once the processing module 110b determines (345) that the processing module 110b is done reading nodes, the processing module 110b enters an end state (350) for this read operation.

The above described processes are beneficial for a number of applications. In particular, architectures where the files system 125 is shared, remote, or distributed benefit from caching and version-controlling nodes. In some of these architectures, nodes 120 and the control file 115 are on the file system 125 and the copy 130 of the control file and the cache 135 of nodes are located in memory. Operating on the copy 130 of the control file and the cache 135 in memory increases the performance of the operations because the aspects of read and write operations that are typically latent, e.g., network or disk access, are minimized. Instead, data is transmitted over a network or read from or written to data store module 105 only when updates occur (i.e., a version associated with a node has changed). Also, the techniques advantageously allow the access layer to be located anywhere.

One example of a benefit is realized when the nodes represent business objects, such as product components or parts, and many business objects are examined and/or updated in one transaction or operation. In this example, business objects stored on the data store module 105 are copied into the memory of the processing module 110. Without the latency imposed by file-opening and reading operations, read and update operations over a large number of business objects in memory are performed more efficiently.

In some implementations, the processing modules 110 are located on different computer systems than the data store module 105, and the processing modules 110 (reading and/or writing) access the data store module 105 over a network. In these implementations, the processing modules 110 are located on "local stores" and the data store modules 105 is considered a "remote store." In some of these implementations, the data store module 105 may be considered a server and the processing modules 110 considered clients. In those implementations, the processing modules 110 make a copy 130 of the control file 115 by accessing the server and making a file copy on the processing module's file system or memory. Retrieving the nodes 120 on the file system 125 to create the cache 135 is achieved in a similar manner (i.e., accessing the server and making local file/in-memory copies). Updates to the server by writing processing modules 110a are accomplished by transmitting the updated files (the copy 130a of the control file and updated nodes) to the server.

The nodes mentioned herein may be database rows or records or columns. The nodes may be represented as files located on a file system or as data within a database. The format of the node identifiers and the node versions described herein are for illustration only and any format can be used. For example node identifiers may be the node's filename or, in the alternative, a property of the file. Regardless of implementation, the nodes are associated with identifiers that distinguish one node from another.

During cache synchronization (e.g., 310), nodes not found in the copy 130 of the control file may be deleted. The techniques above describe retrieving the latest versions of deleted nodes when they are arrived at during the search process, thus efficiently retrieving nodes (e.g., using network resources and creating latencies) only as needed to complete the search. In some implementations, the processing module 110a can alternatively retrieve the latest version of a node during the synchronization process (e.g., 230).

The above described techniques and systems can be implemented using a variety of data structures such as, but not limited to, databases, file systems, B-trees, pi-trees, hash tables and/or hash maps.

The above-described lock file 140 can be implemented as an advisory lock, an exclusive lock, or a shared lock. When a processing module 110a has a lock on the control file 115, other processing modules, 110 are prevented from changing the control file 115 and the nodes 120. To achieve modification prevention, the other processing modules 110 determine if a lock file 145 exists. If the lock file 145 exists, the other processing modules 110 then do not attempt to change the control file 115. The other processing modules 110 then periodically determine if the control file is unlocked (i.e., the lock file 145 is deleted or removed). If the control file 115 is unlocked, the first processing module 110 able to lock the control file 15 gains write access (i.e., becomes processing module 110a) to the control file 115 and nodes 120.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. The alternatives described herein are examples for illustration only and not to limit the alternatives in any way. The steps of the invention can be performed in a different order and still achieve desirable results. Other embodiments are within the scope of the following claims.

What is claimed is:

1. A method for a version-controlled database representation comprising:
    receiving a first node from a file system associated with a data store module, the first node comprising a first identifier, a first version, and a first set of one or more data elements for indexing or searching data stored on the data store module;
    storing the first node in a memory device;
    receiving a first control file from the file system, the first control file comprising information associating a plurality of identifiers with a plurality of versions, including associating a second identifier with a second version; and
    removing the first node from the memory device if the first identifier is identical to the second identifier and if the first version is different from the second version
    determining whether a second node is stored in the memory device;
    if it is determined that the second node is not stored in the memory device, then determining whether a path associated with the second node in the file system is valid;
        if it is determined that the path is valid, then
            (1) receiving the second node from the file system, the second node comprising the second identifier, the second version, and a second set of one or more data elements for indexing or searching data stored on the data store module;
            (2) storing the second node in the memory device; and
        if it is determined that the path is not valid, then receiving a second control file from the file system, the second control file comprising information associating the second identifier with a third version.

2. The method of claim 1 further comprising:
    determining whether a third node is stored in the memory device, the third node comprising a third set of one or more data elements for indexing or searching data stored on the data store module;
    if it is determined that the third node is stored in the memory device, then modifying the third set of one or more data elements and modifying a third version of the third node;
    if it is determined that the third node is not stored in the memory device, then inserting the third node into the memory device and associating the third node with the third version;
    updating the first control file to associate a third identifier of the third node with the third version; and
    writing, to the file system, the updated first control file and the third node.

3. The method of claim 2 further comprising rebalancing a tree if the third node is inserted into the memory device.

4. The method of claim 2 wherein writing the updated first control file to the file system comprises replacing a file system control file.

5. The method of claim 2 further comprising creating, by a first processing module, a lock file on the file system, the lock file preventing one or more processing modules other than the first processing module from changing, modifying, or writing to the file system.

6. The method of claim 5 further comprising deleting the lock file after the updated first control file and the third node have been written to the file system.

7. The method of claim 5 further comprising:
    creating a list of changed nodes file comprising a list representing at least the third node; and
    storing the list of changed nodes on the memory device.

8. The method of claim 1 wherein receiving the first node and the first control file from the file system is without regard to a lock on the file system.

9. The method of claim 1 wherein the memory device is a cache.

10. The method of claim 1 wherein the memory device is remote from the file system and communicates with the file system using a communications network.

11. The method of claim 1 wherein each of the plurality of identifiers comprise a filename or a property.

12. The method of claim 1 wherein the first or second sets of one or more data elements are data elements in a B–tree, a B+tree, a binary tree, a pi-tree, a hash table, a hash map, or any combination thereof.

13. The method of claim 12 wherein the first or second nodes are nodes in a B–tree, a B+tree, or a binary tree.

14. The method of claim 1 wherein the data stored on the data store module comprises business objects.

15. The method of claim 1 wherein the information in the first control file comprises a table.

16. The method of claim 1 further comprising receiving an updated first node from the file system if the first identifier is identical to the second identifier and if the first version is different from the second version, the updated first node comprising the first identifier, an updated first version, and an updated first set of one or more data elements for indexing or searching data stored on the data store module.

17. The method of claim 1 wherein determining whether the second node is stored in the memory device comprises traversing a tree.

18. The method of claim 1 wherein determining whether the path associated with the second node is valid comprises examining the file system location that corresponds to the second identifier.

19. A system for a version-controlled database representation comprising:
    a memory device comprising a first node and a first control file, the first node comprising a first identifier, a first version, and a first set of one or more data elements for indexing or searching data stored on a data store module, the first control file comprising information associating a plurality of identifiers with a plurality of versions, including associating a second identifier with a second version; and
    a processing module configured to
        remove the first node from the memory device if the first identifier is identical to the second identifier and if the first version is different from the second version;
        determine whether a second node is stored in the memory device;
        if it is determined that the second node is not stored in the memory device, then determine whether a path associated with the second node in a file system associated with the data store module is valid;
            if it is determined that the path is valid, then
                (1) receive the second node from the file system, the second node comprising the second identifier, the second version, and a second set of one or more data elements for indexing or searching data stored on the data store module;

(2) store the second node in the memory device; and if it is determined that the path is not valid, then receive a second control file from the file system, the second control file comprising information associating the second identifier with a third version.

20. The system of claim 19 wherein the processing module is further configured to:

determine whether a third node is stored in the memory device, the third node comprising a third set of one or more data elements for indexing or searching data stored on the data store module;

if it is determined that the third node is stored in the memory device, then modify the third set of one or more data elements and modifying a third version of the third node;

if it is determined that the third node is not stored in the memory device, then insert the third node into the memory device and associating the third node with the third version;

update the first control file to associate a third identifier of the third node with the third version; and write, to the file system, the updated first control file and the third node.

21. A computer program product, tangibly embodied in a machine-readable storage device, for use in a version-controlled database representation, the computer program product including instructions being operable to cause a data processing apparatus to:

read, from a memory device, a first node, the first node comprising a first identifier, a first version, and a first set of one or more data elements for indexing or searching data stored on a data store module;

read, from the memory device, a first control file, the first control file comprising information associating a plurality of identifiers with a plurality of versions, including associating a second identifier with a second version; and remove the first node from the memory device if the first identifier is identical to the second identifier and if the first version is different from the second version determine whether a second node is stored in the memory device;

if it is determined that the second node is not stored in the memory device, then determine whether a path associated with the second node in a file system associated with the data store module is valid;

if it is determined that the path is valid, then (1) receive the second node from the file system, the second node comprising the second identifier, the second version, and a second set of one or more data elements, the second set of one or more data elements for indexing or searching data stored on the data store module;

(2) store the second node in the memory device; and if it is determined that the path is not valid, then receive a second control file from the file system, the second control file comprising information associating the second identifier with a third version.

22. The computer program product of claim 21 further including instructions being operable to cause a data processing apparatus to:

determine whether a third node is stored in the memory device, the third node comprising a third set of one or more data elements for indexing or searching data stored on the data store module;

if it is determined that the third node is stored in the memory device, then modify the third set of one or more data elements and modifying a third version of the third node;

if it is determined that the third node is not stored in the memory device, then insert the third node into the memory device and associating the third node with the third version;

update the first control file to associate a third identifier of the third node with the third version; and write, to the file system, the updated first control file and the third node.

23. A system for a version-controlled database representation comprising:

means for receiving a first node from a file system associated with a data store module, the first node comprising a first identifier, a first version, and a first set of one or more data elements for indexing or searching data stored on the data store module;

means for storing the first node in a memory device;

means for receiving a first control file from the file system, the first control file comprising information associating a plurality of identifiers with a plurality of versions, including associating a second identifier with a second version;

means for removing the first node from the memory device if the first identifier is identical to the second identifier and if the first version is different from the second version; and means for causing a data processing apparatus to:

determine whether a second node is stored in the memory device;

if it is determined that the second node is not stored in the memory device, then determine whether a path associated with the second node in the file system is valid;

if it is determined that the path is valid, then (1) receive the second node from the file system, the second node comprising the second identifier, the second version, and a second set of one or more data elements for indexing or searching data stored on the data store module;

(2) store the second node in the memory device; and if it is determined that the path is not valid, then receive a second control file from the file system, the second control file comprising information associating the second identifier with a third version.

24. The system for a version-controlled database representation of claim 23 further comprising:

means for determining whether a third node is stored in the memory device, the third node comprising a third set of one or more data elements for indexing or searching data stored on the data store module;

means for, if it is determined that the third node is stored in the memory device, modifying the third set of one or more data elements and modifying a third version of the third node;

means for, if it is determined that the third node is not stored in the memory device, inserting the third node into the memory device and associating the third node with the third version;

means for updating the first control file to associate a third identifier of the third node with the third version; and means for writing, to the file system, the updated first control file and the third node.

* * * * *